United States Patent
Sun et al.

(10) Patent No.: US 10,938,561 B2
(45) Date of Patent: Mar. 2, 2021

(54) TUPLE LEVEL SECURITY FOR STREAMS PROCESSING

(71) Applicant: International Business Machines Corporation, Armonk, NY (US)

(72) Inventors: Jingdong Sun, Rochester, MN (US); Roger A. Mittelstadt, Byron, MN (US); Jessica R. Eidem, Rochester, MN (US); Rafal P. Konik, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 337 days.

(21) Appl. No.: 16/014,852

(22) Filed: Jun. 21, 2018

(65) Prior Publication Data

US 2019/0394037 A1 Dec. 26, 2019

(51) Int. Cl.
*G06F 11/30* (2006.01)
*G06F 12/14* (2006.01)
*H04L 9/14* (2006.01)
*H04L 9/08* (2006.01)

(52) U.S. Cl.
CPC .............. *H04L 9/14* (2013.01); *H04L 9/08* (2013.01); *H04L 9/0866* (2013.01)

(58) Field of Classification Search
CPC ............ H04L 9/14; H04L 9/08; H04L 9/0866
USPC ......................................................... 713/189
See application file for complete search history.

(56) References Cited

U.S. PATENT DOCUMENTS

| 5,614,927 A * | 3/1997 | Gifford ............... G06F 21/6245 713/182 |
| 8,954,723 B2 * | 2/2015 | Branson .................. H04L 9/008 713/150 |
| 9,325,742 B1 * | 4/2016 | Barsness ................. H04L 63/20 |
| 10,095,745 B2 * | 10/2018 | Jimenez Peris ....... G06F 9/5088 |
| 10,659,316 B1 * | 5/2020 | Jain ..................... H04L 41/5054 |
| 2003/0135515 A1 * | 7/2003 | Gray .......................... G06F 9/46 |
| 2005/0102615 A1 * | 5/2005 | Roman ..................... G06F 8/00 715/234 |
| 2006/0126619 A1 * | 6/2006 | Teisberg ................. H04L 61/25 370/389 |
| 2006/0150188 A1 * | 7/2006 | Roman ................. G06F 9/4887 718/104 |

OTHER PUBLICATIONS

Rimma V. Nehme; A Security Punctuation Framework for Enforcing Access Control on Streaming Data; IEEE; 2008; pp. 406-415.*

(Continued)

*Primary Examiner* — Monjur Rahim
(74) *Attorney, Agent, or Firm* — Martin & Associates, LLC; Derek P. Martin (57) ABSTRACT

A public operator processes data streams from multiple operators in different streaming applications to reduce resource costs and increase efficiency in a streaming system. The public operator uses tuple level security with a unique key for each streaming application to securely process the data streams. A stream security module (SSM) manages encryption to and from the public operators to insure other streaming applications with access to the shared public operator don't have access to data of other applications that may belong to other customers or users. The stream security module may be incorporated into the streams manager of a streaming system.

20 Claims, 8 Drawing Sheets

(56)  References Cited

OTHER PUBLICATIONS

Ng et al., "Privacy Preservation in Streaming Data Collection," 2012 IEEE 18th International Conference on Parallel and Distributed Systems (ICPADS), pp. 810-815, IEEE, 2012.
Carminati et al., "A Framework to Enforce Access Control Over Data Streams," ACM Transactions on Information and System Security (TISSEC) 13, No. 3, 2010.
Adaikkalavan et al., "Secure Shared Continuous Query Processing," Proceedings of the 2011 ACM Symposium on Applied Computing, pp. 1000-1005, ACM, 2011.
Ng et al., "Limiting Disclosure for Data Streams in the Cloud," Proceedings of the 2nd International Conference on Cloud Computing and Services Science (CLOSER), vol. 1, pp. 574-579, 2012.
Xie et al., "Information Flow Control for Stream Processing in Clouds," Proceedings of the 18th ACM Symposium on Access Control Models and Technologies, pp. 89-100, ACM, 2013.

* cited by examiner

TUPLE LEVEL SECURITY FOR STREAMS PROCESSING

BACKGROUND

1. Technical Field

This disclosure generally relates to streaming applications and communication, and more specifically relates to tuple level security for streams processing on a public operator.

2. Background Art

Streaming applications are becoming more common due to the high performance that can be achieved from near real-time processing of streaming data. A streaming application is organized as a data flow graph consisting of multiple operators connected via stream connections that each process streaming data in near real-time. An operator typically takes in streaming data in the form of data tuples, operates on the tuples in some fashion, and outputs the processed tuples to the next operator in the flow graph.

Security and privacy of streaming data are typically handled at the operator or application instance level. Streaming data traffic between operators within a node or between nodes over network links may be encrypted for security using connection encryption techniques. Operators or operator instances are typically unique to a given application/job and user.

BRIEF SUMMARY

A public operator processes data streams from multiple operators in different streaming applications to reduce resource costs and increase efficiency in a streaming system. The public operator uses tuple level security with a unique key for each streaming application or user to securely process the data streams. A stream security module (SSM) manages encryption to and from the public operators to insure other streaming applications with access to the shared public operator don't have access to data of other applications that may belong to other customers or users. The stream security module may be incorporated into the streams manager of a streaming system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The disclosure and claims herein relate to a public operator that processes data streams from multiple operators in different streaming applications to reduce resource costs and increase efficiency in a streaming system. The public operator uses tuple level security with a unique key for each streaming application or user to securely process the data streams. A stream security module (SSM) manages encryption to and from the public operators to insure other streaming applications with access to the shared public operator don't have access to data of other applications that may belong to other customers or users. The stream security module may be incorporated into the streams manager of a streaming system.

In a cloud environment may users or customers of a streaming platform may use have a need for a common streaming application or portion of an application referred to herein as an operator. Allowing multiple operators to use a common operator could increase efficiency in the system. However, allowing multiple users to use a common operator may introduce a security issue where the multiple users/customers using a single instance of the operator could have access to streaming application of other users. The public operators described herein incorporate tuple level security to protect data streams. The tuple level security provides security of the streaming data from other streaming applications also using the public operator where some of the streaming applications may belong to other users or customers.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
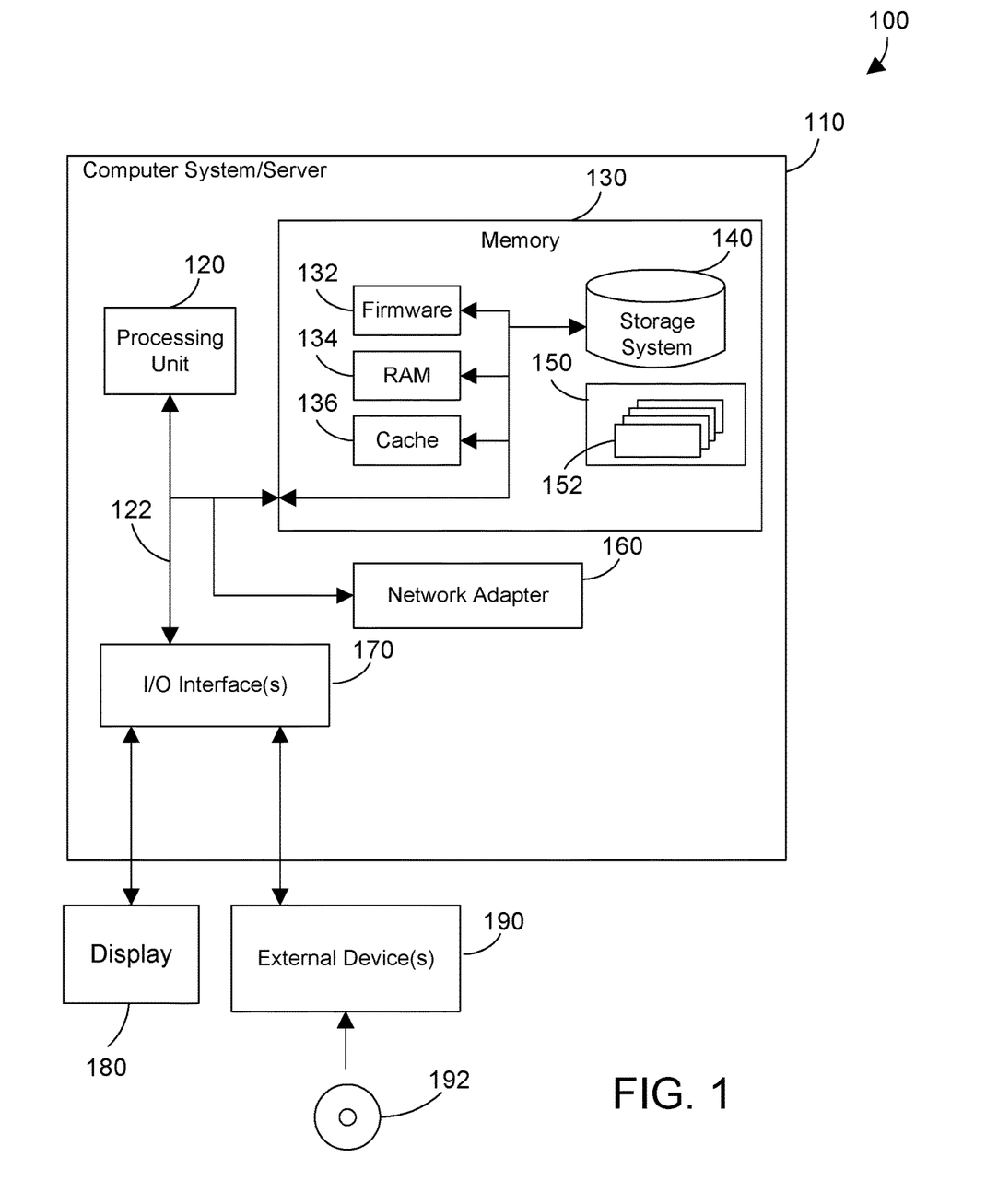
FIG. 1 is a block diagram of a cloud computing node.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
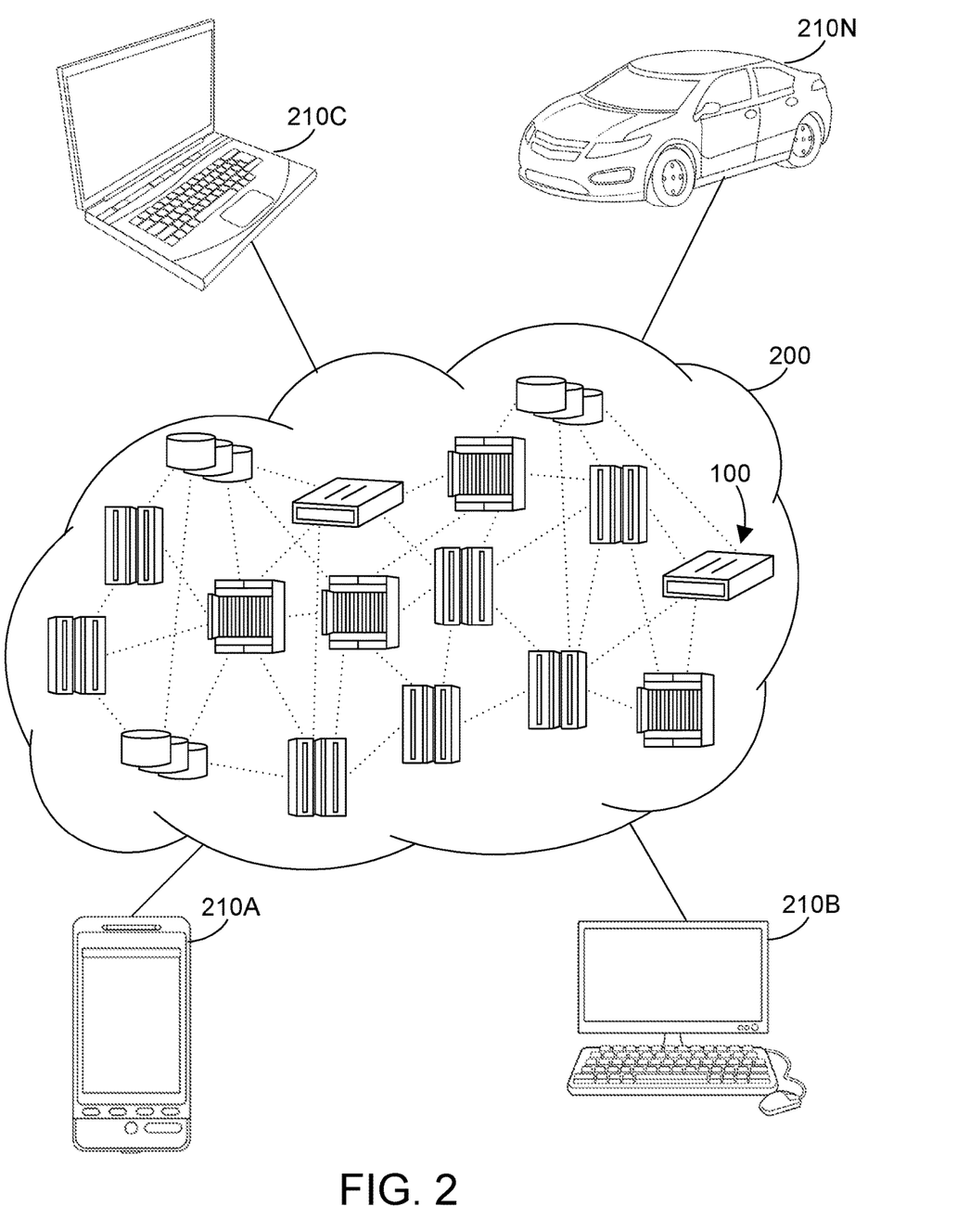
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
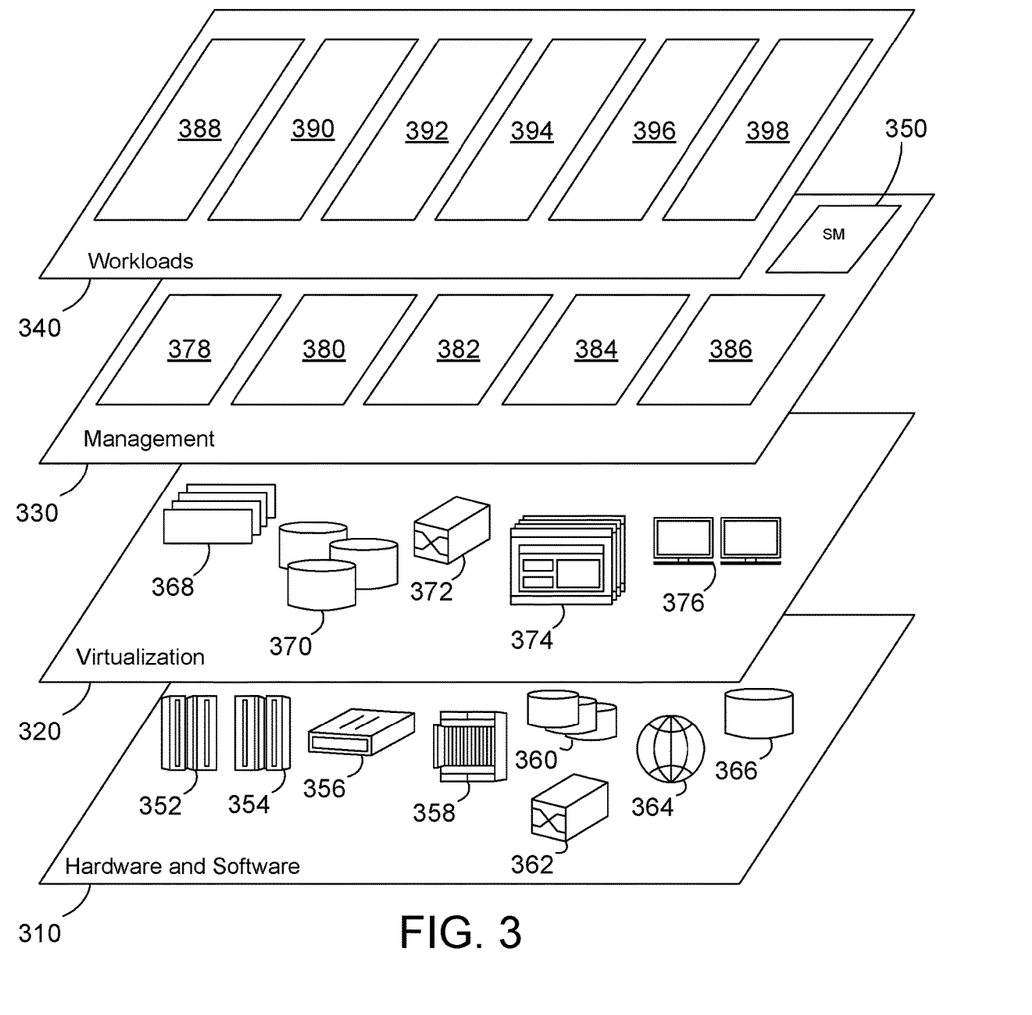
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 350 as described herein. While the SM 350 is shown in FIG. 3 to reside in the management layer 330, the SM 350 actually may span other levels such as the applications layer 340 shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

As will be appreciated by one skilled in the art, aspects of this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 4:
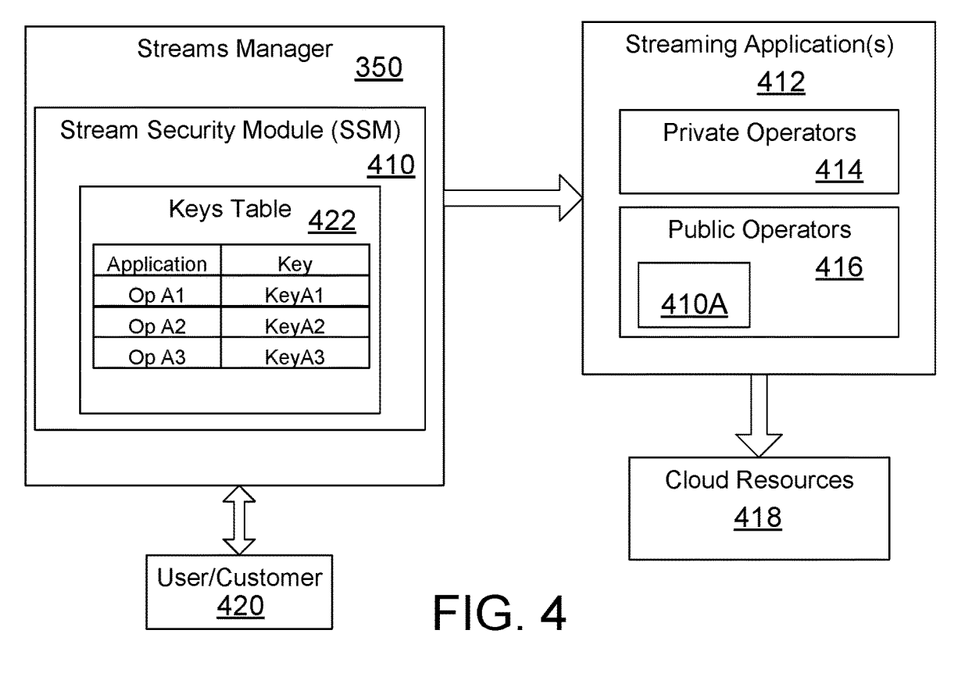
FIG. 4 is a block diagram showing an example of a streams manager and public operators that processes data streams from multiple operators belonging to different users to reduce resource costs and increase efficiency in a streaming system as described herein.

FIG. 4 shows one suitable example of the streams manager 350 introduced in FIG. 3 with a stream security module (SSM) 410 which manages encryption to and from the public operators as described herein. The streams manager 350 is software that manages one or more streaming applications. In this simplified example, the streams manager 350 manages streaming application 412. The streaming application 412 may comprise a number of private operators 414 and public operators 416 that may be represented in the form of a flow graph as known in the prior art. The management of the streaming application(s) 412 includes managing private operators 414, public operators 416 and data flow connections between the operators when the operators are placed on cloud resources 418. Cloud resources 418 may include the hardware and software resources 310 shown in FIG. 3. In the illustrated example, the stream security module (SSM) 410 is shown incorporated into the streams manager 350 but in other examples may be a stand-alone module. In another example, a portion of the SSM 410 may reside in a SSM 410A attached to each public operator 416. The SSM 410A communicates with the SSM 410 to perform the functions described herein. It is to be understood that references herein to the SSM 410 also include the SSM 410A.

Again referring to FIG. 4, the public operators 416 are streaming application operators that can be shared between streaming applications and incorporate tuple level security to protect data streams as described herein. The tuple level security provides security of the streaming data from other streaming applications also using the public operator where some of the streaming applications may belong to other users or customers. In contrast, the private operators 414 are streaming operators that are used by a single streaming application. The private operators 414 may send tuple streams to a public operator using tuple level security as described further herein. The public operators can receive tuple streams from multiple private operators.

Again referring to FIG. 4, the stream security module (SSM) 410 may include a keys table 422 as shown. The keys table 422 has a suitable record structure to store application IDs and their associated keys assigned by the SSM 410. In this example, there are three applications operator A1, operator A2 and operator A3 with respective keys keyA1, keyA2 and keyA3. The use of the keys by the operators is explained further in the example below and shown in FIG. 6. The keys table 422 represents any data structure for storing application ID's and their associated keys. One of ordinary skill in the art will recognize that other suitable data structures could be used.

Figure 5:
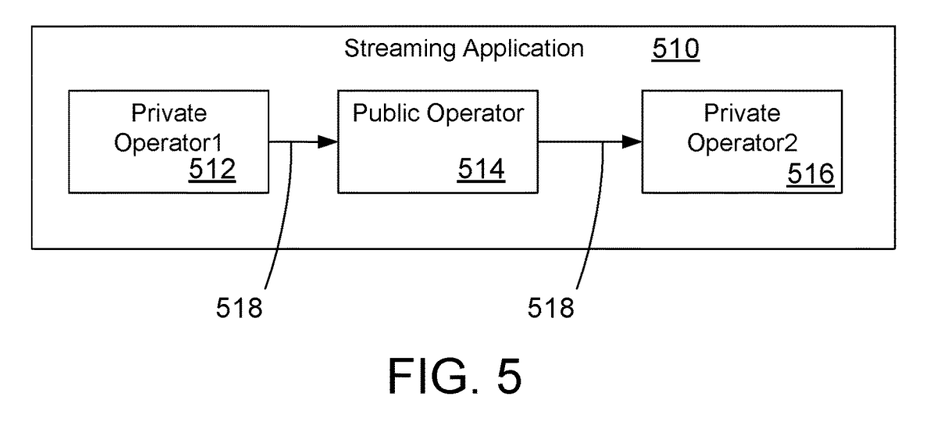
FIG. 5 illustrates a simplified block of a streaming application with a public operator.

FIG. 5 illustrates a simplified block diagram of a streaming application 510. The streaming application 510 includes a private operator1 512 which passes tuples over a link or interconnection 518 to a public operator 514. The public operator 514 then passes tuples to private operator2 516. While this simple example shows only 3 operators, it is recognized that a streaming application may have any number of operators including multiple public operators. The interconnections 518 between the operators may be similar to prior art interconnections between streaming operators. Prior art operator interconnections may use application level encryption or interconnection based encryption. This type of security is particularly used where the interconnections are intra node connections. However, in contrast to prior art interconnections, the communication between nodes herein uses tuple level security as described herein. Tuple level security allows for a public operator that can be shared by different applications while maintaining security between users of data flowing through the public operator.

Figure 6:
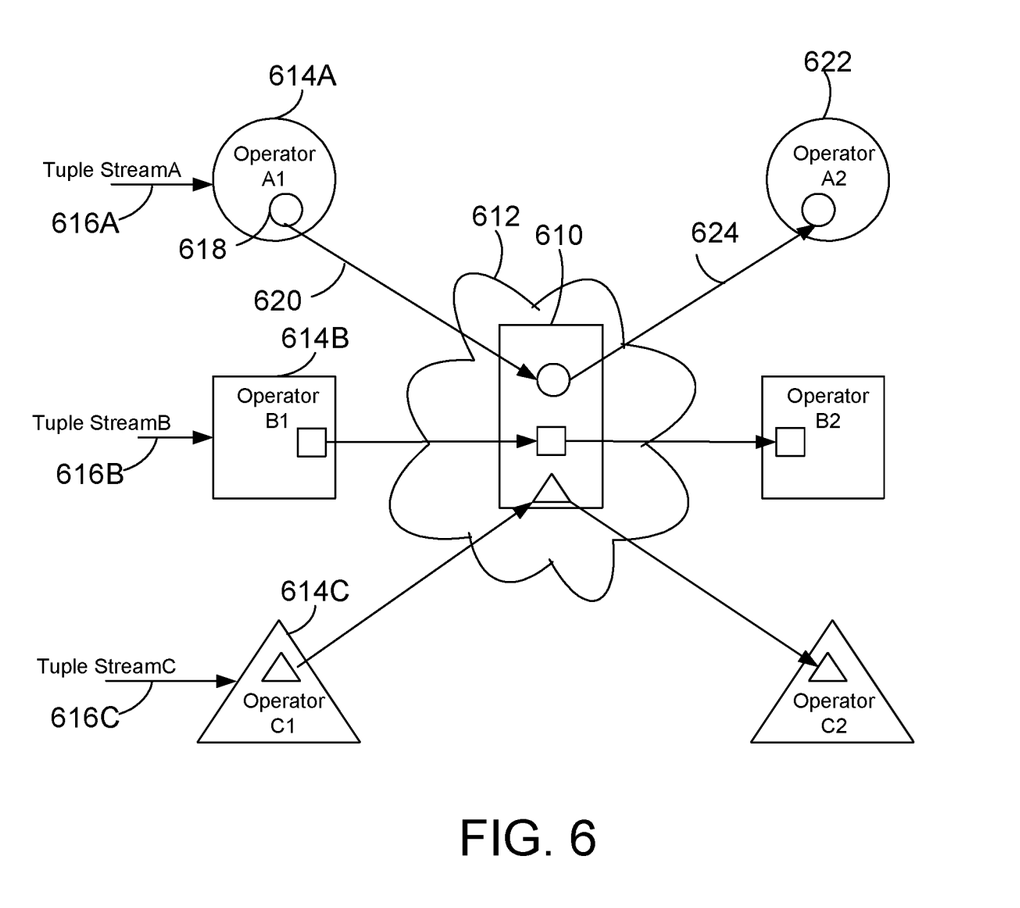
FIG. 6 illustrates an example of a public operator that processes data streams from multiple operators belonging to different users.

FIG. 6 illustrates an example of a public operator that processes data streams from multiple operators of different streaming applications. In this example, public operator 610 executes on cloud resources of cloud 612. In this simplified example, public operator 610 receives streaming tuple data from three private operators 614A, 614B, 614C (collectively referred to as private operators 614). Each of the private operators 614 receives a tuple input stream from an external source. For example, private operatorA1 614A receives an input tuple streamA 616A. After processing the input tuple streamA 616A, OperatorA1 614A encrypts the data using a key provided to the operator and sends the encrypted data over communication link 620 to the public operator 610. In this illustration, the smaller shape represents encryption of the tuples corresponding to the private operators. Thus, encrypted data 618 of tuple streamA 616A is represented by the circle in the private operator 614A. The other private operators 614 are similarly illustrated with encrypted tuples. The public operator 610 receives the encrypted data 618 from each of the private operators 616. The public operator 610 decrypts the encrypted data using the corresponding key received from the stream security module 410. After processing the decrypted tuple stream, the public operator may then encrypt the data and transmit the encrypted data to the next operator in the flow graph of an application. In this example, public operator 610 sends encrypted data to operatorA2 622 over communication link 624 where the data originated from the corresponding operatorA1 614A. The public operator 610 similarly sends encrypted data to the other operators as shown.

Again referring to FIG. 6, we will now consider an example of managing encryption of data flowing through a public operator to securely process data streams from multiple operators from different applications. The streams manager 350 receives a streaming application and analyzes the streaming application to assess whether any of the operators are public operators or can be implemented with a public operator. If there are no public operators then all the operators are private and the streams manager can continue in a conventional manner to place and manage the operators in the streaming application. If any operator is a public operator or is compatible with and can be implemented with a public operator, then the streams manager in conjunction with the streams security module can set up the tuple stream to be processed by the identified public operator. The streams security module then generates a unique key based on data unique to the streaming application. For example, the key may be based on an application ID, job ID, user ID, customer ID or similar. The generated key is used for both the public and private operators to encrypt and decrypt the tuple stream to and from the public operator. The streams security module then submits the generated key to private and public operators involved in the corresponding data stream. The streams security module may then configure all private operators that connect to public operators by providing a unique key as described above to insure they are able to decrypt and encrypt the corresponding data streams. Providing the key(s) to the public operator may be done over a secure connection to the public operator. The streams manager then starts the private operators that have been configured.

Again referring to FIG. 6, after being started, private operator 614A receives an unencrypted tuple stream 616A from an external source. In this case, decryption of the input stream is not necessary so the operator determines whether the tuple is going to be sent to a public operator. If the tuple is not being sent to a public operator then no encryption is necessary and the operator continues in a conventional manner. In this case, the tuple is being sent to public operator 610 so the operator will encrypt the tuple with the key provided from the streams security module and send the tuple stream to the public operator 610. The encrypted tuple stream is received by the public operator 610.

Again referring to FIG. 6, the public operator 610 determines if the tuple stream is encrypted and thus needs to be decrypted by analyzing the incoming data and recognizing that the data is encrypted. If the tuple stream does not need to be decrypted then the public operator 610 process the tuples in a conventional manner. In this case, the tuple stream does need to be decrypted so the public operator 610 decrypts the tuple stream with the key provided by the streams security module 410. The public operator 610 then processes the decrypted tuple stream in a conventional manner depending on the function of the operator. After processing, the public operator 610 may then encrypt the tuple stream to send to the next operator. In this example, the public operator 610 then sends the encrypted tuple stream over the communications link 624 to the next operator which is private operatorA2 622. The private operator A2 622 processes the incoming data in the same manner as described above for private operatorA1 614A. However, in this case the incoming data would be encrypted so the data would need to be decrypted in the same manner as described for the public operator. The private operator would then continue as in the previous paragraph for private operatorA1 614A.

Figure 7:
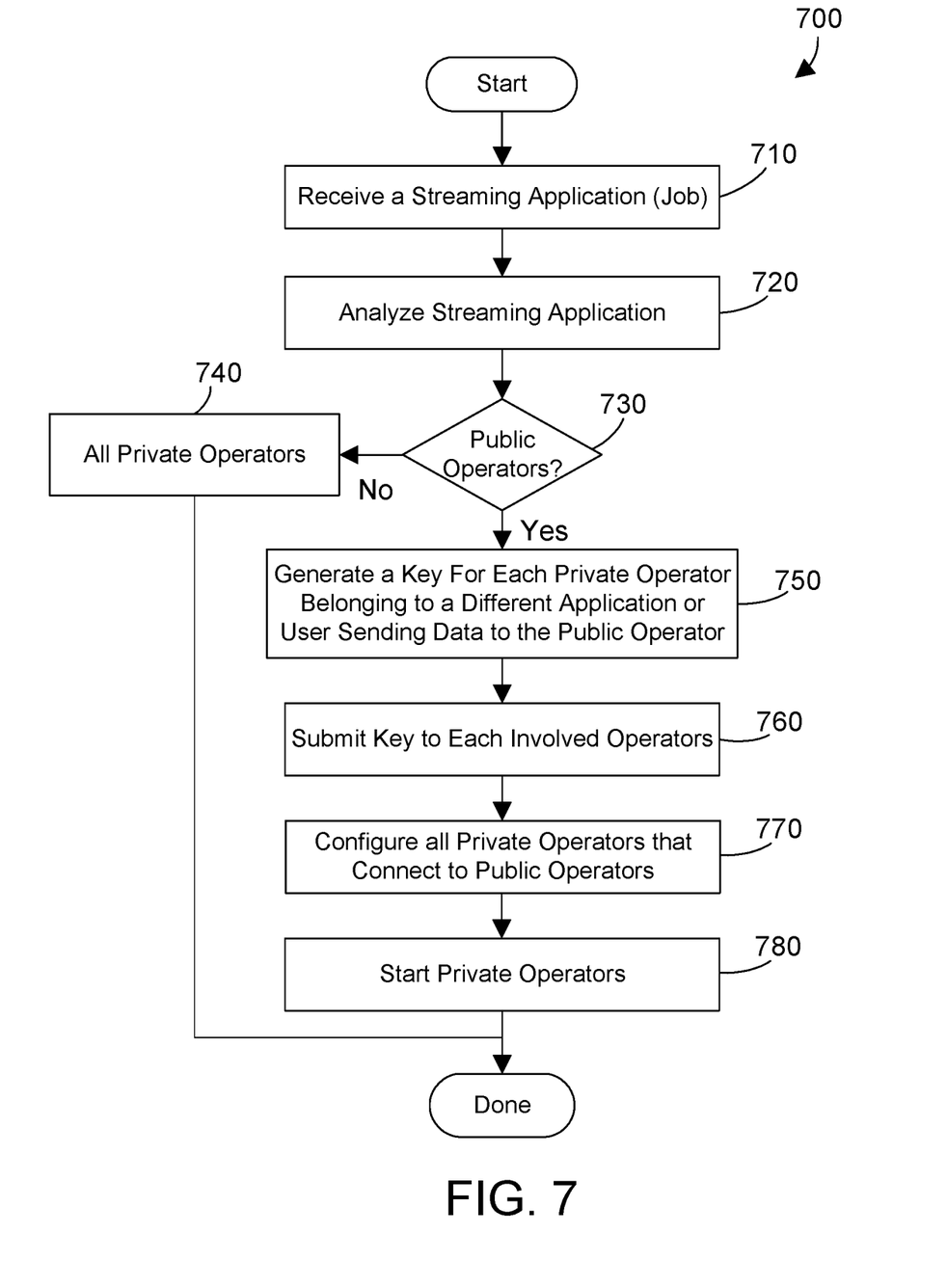
FIG. 7 is a flow diagram of a method for managing encryption of data flowing through a public operator to securely process data streams from multiple operators belonging to different users.

Referring to FIG. 7, a method 700 shows one suitable example for managing encryption of data flowing through a public operator to securely process data streams from multiple private operators from different streaming applications. Method 700 is preferably performed by the streams manager 350 and the stream security module 410 as shown in FIG. 4. First, receive a streaming application (sometimes referred to as a "job") (step 710). The streaming application may originate from a streaming application of a user or customer. Then analyze the streaming application to assess whether any of the operators are public operators or can be implemented with a public operator (step 720). If there are no public operators (step 730=no) then all the operators are private (step 740) and the method is done. If there are public operators (step 730=yes) then generate a key for each private operator belonging to a different streaming application or different user sending data to the public operator. The key may be based on the job ID, user ID or any other suitable information that uniquely identifies the operator of the streaming application (step 750). Then submit the generated keys to all involved operators (step 760). Configure all private operators that connect to public operators (step 770). Start the private operators (step 780). The method is then done.

Figure 8:
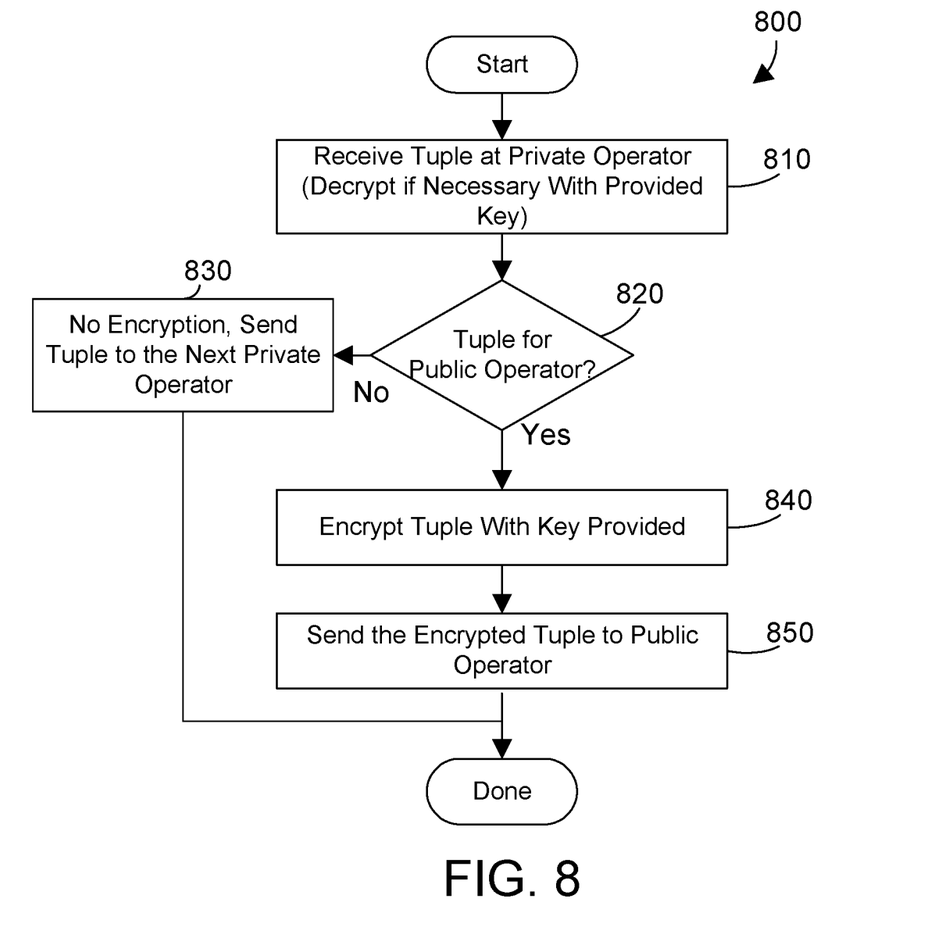
FIG. 8 is a flow diagram of a method for a private operator to process tuples of data using tuple level security.

FIG. 8 shows one suitable example of a method for processing tuple level security at a private operator. Method 800 thus shows suitable steps for processing on the private operators 614, 622 as shown in FIG. 6. First, receive a tuple at a private operator (step 810). If necessary, the tuple received at the private operator is decrypted with the key corresponding to the operator of the streaming application as discussed above. Decryption may be necessary where the private operator is receiving the tuple from a public operator. Next, determine if the tuple is going to be sent to a public operator (step 820). If the tuple is not being sent to a public operator (step 820=no) then no encryption is necessary and the tuple can be sent to the next private operator (step 830) and the method is done. If the tuple is being sent to a public operator (step 820=yes) then encrypt the tuple with the key corresponding to the operator of the streaming application (step 840). Send the encrypted tuple to the public operator (step 850). Then the method is then done.

Figure 9:
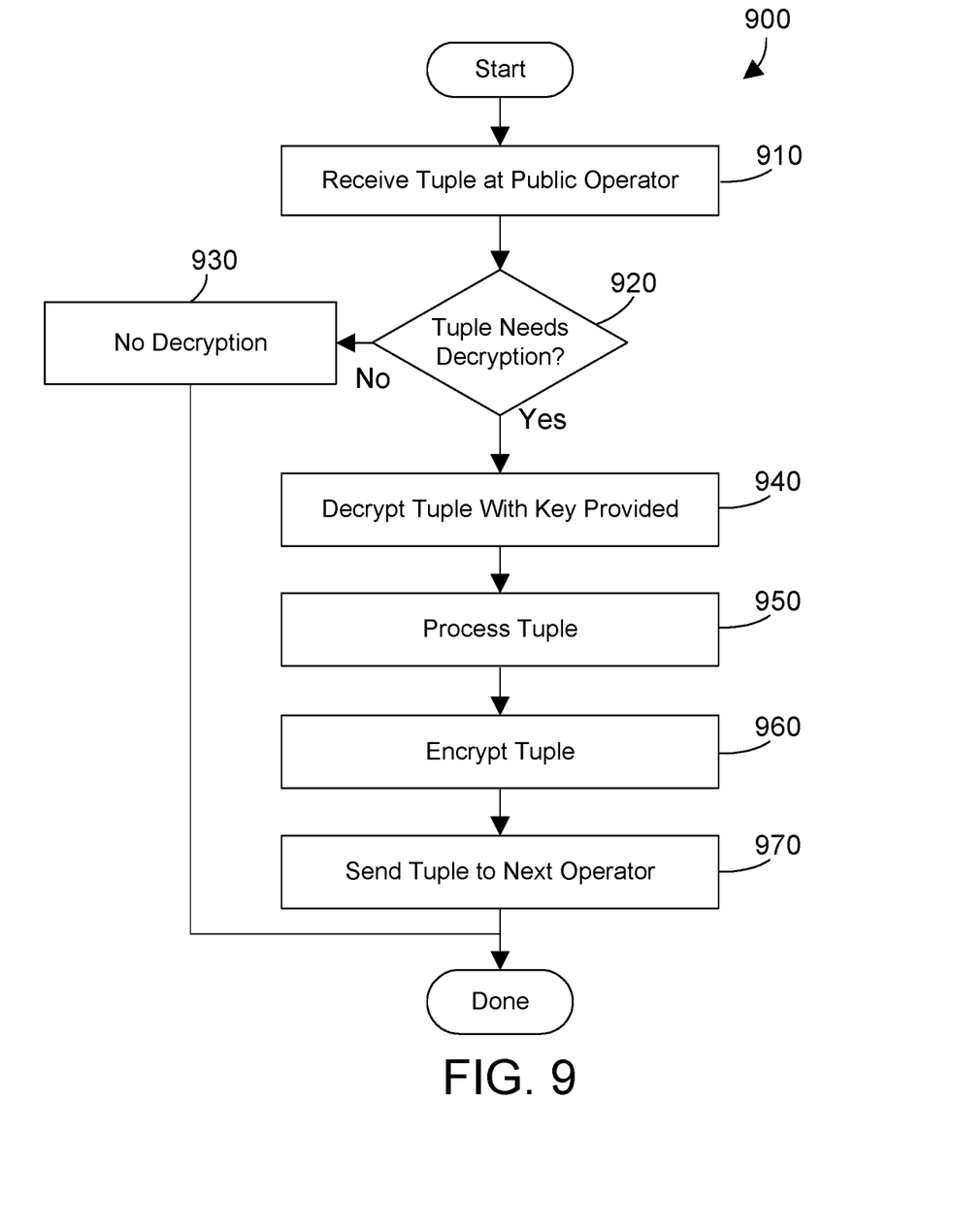
FIG. 9 is a flow diagram of a method for a public operator to process tuples of data using tuple level security.

FIG. 9 shows one suitable example of a method for processing tuples with tuple level security at a public operator. Method 900 thus shows suitable steps for processing encrypted communication 620 from a private operator 614 on a public operator 610 as shown in FIG. 6. First, receive a tuple at a public operator (step 910). Next, determine if the tuple needs to be decrypted by analyzing the incoming data and recognizing that the data is encrypted (step 920). If the tuple does not need to be decrypted (step 920=no) then no decryption is necessary (step 930) and the method is done. If the tuple does need to be decrypted (step 920=yes) then decrypt the tuple with the key provided (step 940). Process the tuple on the public operator (step 950). Then encrypt the tuple to be send to the next operator (step 960) and send the tuple to the next operator (step 970). Then the method is then done.

The disclosure and claims herein describe a public operator that processes data streams from multiple operators in different streaming applications to reduce resource costs and increase efficiency in a streaming system. The public operator uses tuple level security to securely process the data streams. A stream security module (SSM) manages encryption to and from the public operators to insure other streaming applications with access to the shared public operator don't have access to data of other applications that may belong to other customers or users. The stream security module may be incorporated into the streams manager of a streaming system.

The claims and disclosure herein support an apparatus comprising: at least one processor; a memory coupled to the at least one processor; a streams manager residing in the memory and executed by the at least one processor that manages a streaming application on a plurality of computer nodes, wherein the streaming application comprises a plurality of operators that communicate tuples of streaming data between the plurality of operators; a public operator of the plurality of operators that processes the tuples of streaming data from a plurality of operators of different streaming applications; a stream security module residing in the memory and executed by the at least one processor, wherein the stream security module generates a plurality of keys for the public operator to process data from the plurality of operators of different streaming applications where each key of the plurality of keys corresponds to a unique streaming application; and wherein the public operator decrypts tuples of streaming data from the plurality of operators of different applications with the plurality of keys.

The claims and disclosure herein further support a computer-implemented method executed by at least one processor for managing a streaming application comprising a plurality of operators that communicate streaming data between the plurality of operators, the method comprising: receive a job from a user; analyze the job to determine whether there are public operators; when a public operator is found, generating a key for each private operator belonging to a different user that is sending data to the public operator; submitting a key to all involved operators; configuring all private operators that connect with the public operator; and starting the private operators.

The claims and disclosure herein further support a computer-implemented method executed by at least one processor for managing a streaming application comprising a plurality of operators that communicate streaming data between the plurality of operators, the method comprising: receive a job from a user; analyze the job to determine whether there are public operators; when a public operator is found, generating a key for each private operator belonging to a different user that is sending data to the public operator; submitting a key to all involved operators; configuring all private operators that connect with the public operator to send encrypted data to the public operators with the key provided to the private operator; starting the private operators; receiving a tuple at a private operator, and when the tuple is for a public operator encrypting the tuple with the key provided and sending it to the public operator; and receiving the tuple at the public operator, determining if the tuple is encrypted, and when the tuple is encrypted, decrypting the encrypted tuple with the key provided.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streams manager residing in the memory and executed by the at least one processor that manages a streaming application, wherein the streaming application comprises a plurality of operators that communicate tuples of streaming data between the plurality of operators;
   a public operator of the plurality of operators that processes the tuples of streaming data from a plurality of operators of different streaming applications;
   a stream security module residing in the memory and executed by the at least one processor, wherein the stream security module generates a plurality of keys for the public operator to process data from the plurality of operators of different streaming applications where each key of the plurality of keys corresponds to a unique streaming application; and wherein the public operator decrypts tuples of streaming data from the plurality of operators of different applications with the plurality of keys.

2. The apparatus of claim 1 wherein the streams manager receives a job of a streaming application and analyzes the job to determine if there are public operators.

3. The apparatus of claim 1 wherein the stream security module further provides a key to a private operator to encrypt data sent to the public operator.

4. The apparatus of claim 3 wherein the streams security module uses a piece of data unique to the streaming application to generate the key.

5. The apparatus of claim 4 wherein the piece of data unique to the application is chosen from: user identification, application identification, job identification, or customer identification.

6. The apparatus of claim 3 wherein the stream security module configures private operators to send data to the public operators encrypted with the key provided to the private operator.

7. The apparatus of claim 6 wherein the streams manager starts the configured private operators.

8. The apparatus of claim 7 wherein the configured private operators encrypt tuples of streams data and send the tuples of streams data to the public operator.

9. The apparatus of claim 8 wherein the public operator decrypts the encrypted tuples of streams data, processes the tuples of streams data, encrypts the processed tuples of streams data and sends the encrypted and processed tuples of streams data to a next operator.

10. A computer-implemented method executed by at least one processor for managing a streaming application comprising a plurality of operators that communicate streaming data between the plurality of operators, the method comprising:
  receive a job from a user;
  analyze the job to determine whether there are public operators that process tuples of streaming data from a plurality of operators of different streaming applications;
  when a public operator is found, generating a key for each private operator belonging to a different user corresponding to a different streaming application that is sending data to the public operator;
  submitting a key to all involved operators;
  configuring all private operators that connect with the public operator; and
  starting the private operators.

11. The method of claim 10 wherein the key is generated using a piece of data unique to the streaming application to generate the key.

12. The method of claim 11 wherein the piece of data unique to the application is chosen from: user identification, application identification, job identification, or customer identification.

13. The method of claim 10 further comprising configuring the private operators to send encrypted data to the public operators with the key provided to the private operator.

14. The method of claim 10 further comprising a private operator of the plurality of private operators receiving a tuple and when the tuple is for a public operator encrypting the tuple with the key provided and sending it to the public operator.

15. The method of claim 10 further comprising decrypting the received tuple when necessary with the provided key.

16. The method of claim 10 further comprising: the public operator receiving a tuple, determining if the tuple is encrypted, and when the tuple is encrypted, decrypting the encrypted tuple with the key provided.

17. The method of claim 16 further comprising: processing the tuple, encrypting the processed tuple and sending the encrypted and processed tuple to a next operator.

18. A computer-implemented method executed by at least one processor for managing a streaming application comprising a plurality of operators that communicate streaming data between the plurality of operators, the method comprising:
  receive a job from a user;
  analyze the job to determine whether there are public operators;
  when a public operator is found, generating a key for each private operator belonging to a different user that is sending data to the public operator;
  submitting a key to all involved operators;
  configuring all private operators that connect with the public operator to send encrypted data to the public operators with the key provided to the private operator;
  starting the private operators;
  receiving a tuple at a private operator, and when the tuple is for a public operator encrypting the tuple with the key provided and sending it to the public operator; and
  receiving the tuple at the public operator, determining if the tuple is encrypted, and when the tuple is encrypted, decrypting the encrypted tuple with the key provided.

19. The method of claim 18 wherein the step of receiving the tuple at the public operator further comprises: processing the tuple, encrypting the processed tuple and sending the encrypted and processed tuple to a next operator.

20. The method of claim 18 wherein the key is generated using a piece of data unique to the streaming application to generate the key.

* * * * *